May 16, 1939.    C. W. KANOLT    2,158,660
STEREOSCOPIC PHOTOGRAPHY
Filed June 15, 1936    3 Sheets-Sheet 1
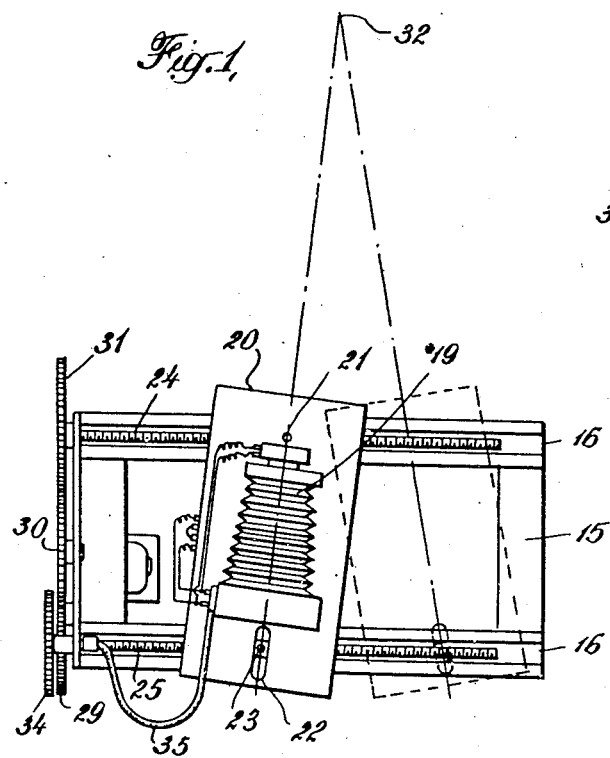
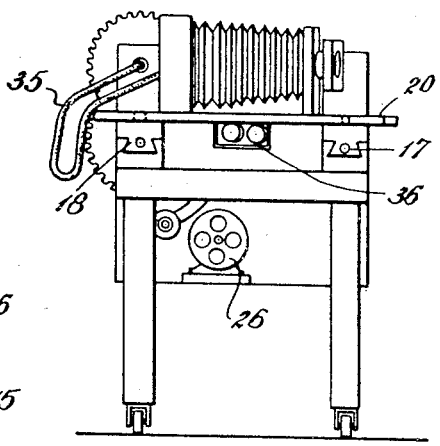
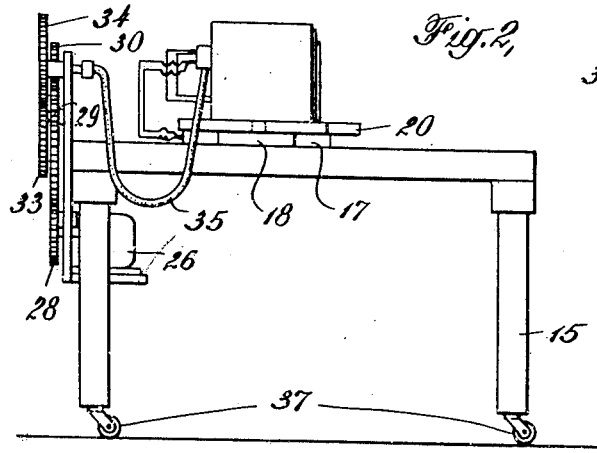
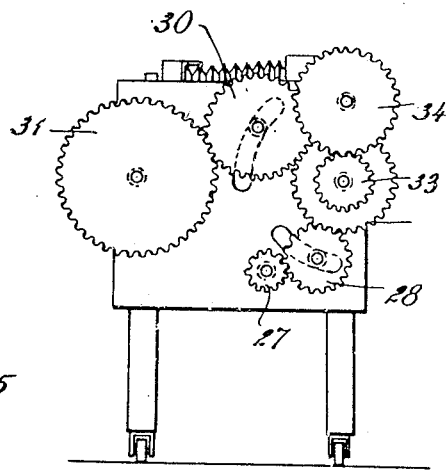
INVENTOR
Clarence W. Kanolt
BY
ATTORNEYS

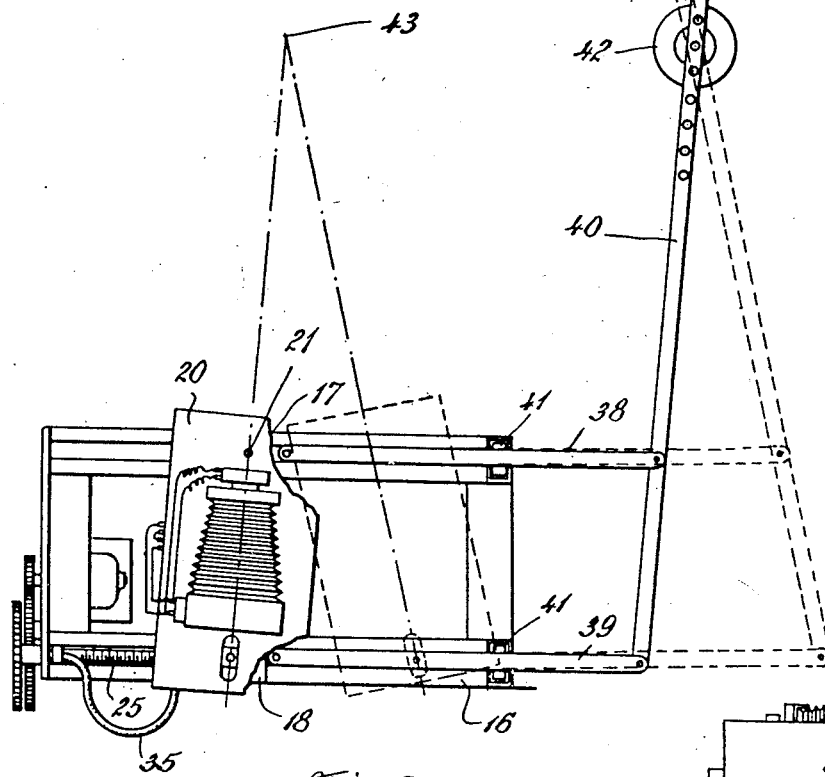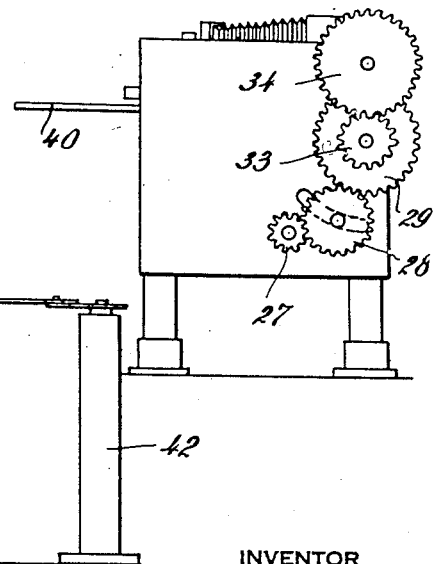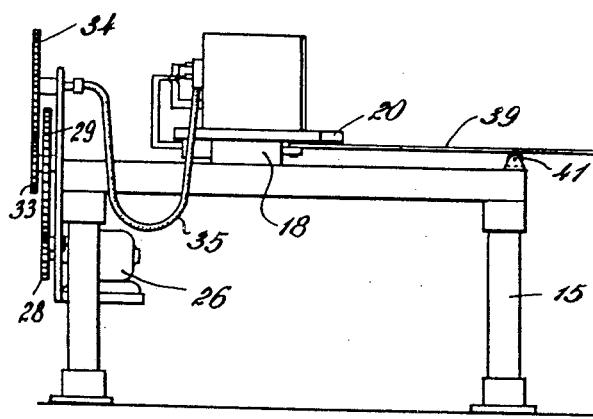

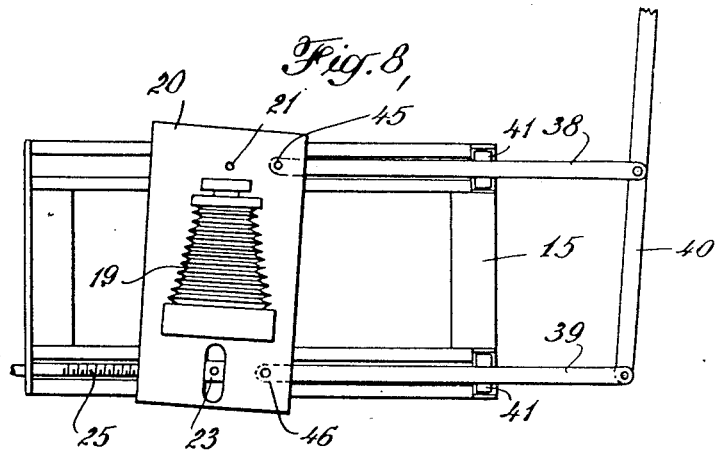
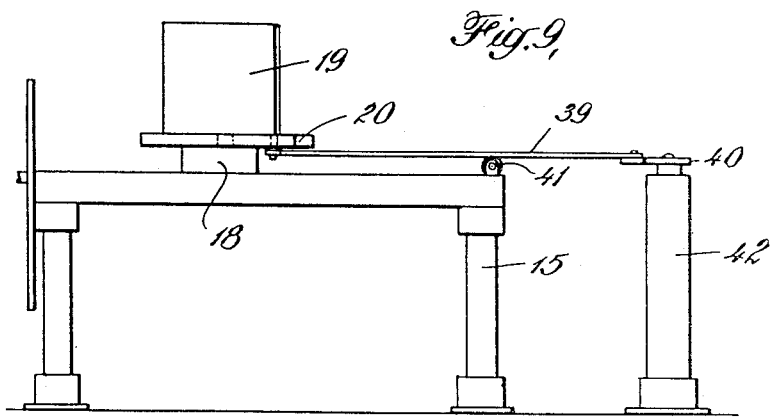
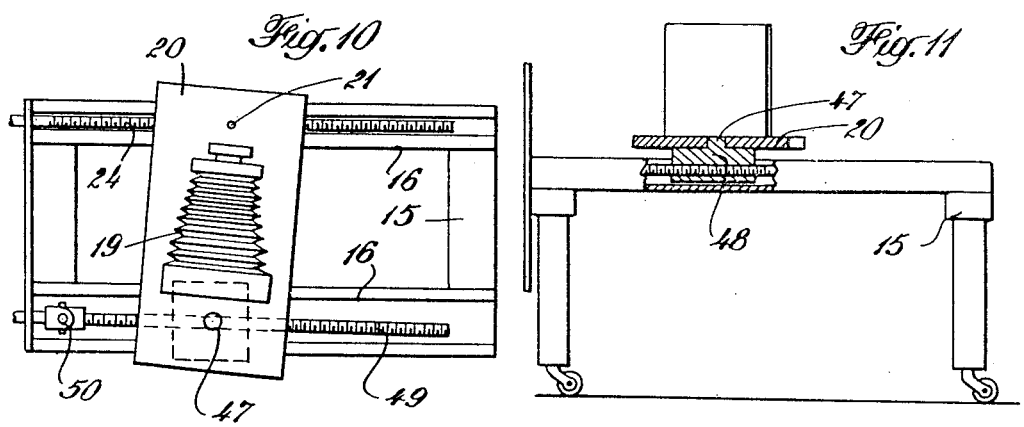

Patented May 16, 1939

2,158,660

UNITED STATES PATENT OFFICE 2,158,660

STEREOSCOPIC PHOTOGRAPHY

Clarence W. Kanolt, Pelham Manor, N. Y.

Application June 15, 1936, Serial No. 85,285

14 Claims. (Cl. 95—36)

This invention relates to mountings for moving photographic cameras, and has particular reference to mountings for use in the production of stereoscopic pictures. The invention is especially applicable to the production of pictures of the "depthograph" or "parallax panoramagram" type, which exhibit binocular stereoscopic relief when viewed with suitable viewing means.

A "depthograph" or "parallax panoramagram" image may be described broadly as a composite image containing interlineated views of an object field as seen from a plurality of points of view. More specifically, a depthograph or parallax panoramagram image is a composite image composed of a plurality of lineated panels, different panels representing different portions of the object field on which the camera is focussed, and a single panel containing a lineated image of a single portion of said object field as seen from a plurality of points of view. In general, any portion of the object field lying in the principal plane on which the camera is focussed will be recorded in only one panel of the parallax panoramagram, while portions lying in planes far removed from the principal plane will be recorded in more than one panel.

Apparatus has been heretofore devised for producing images of this general type by moving a camera in an arc about a chosen point in the object field, at which point the principal objects being photographed are usually placed, exposing the sensitive plate in the camera through a closely adjacent lineating screen, and moving the lineating screen and the sensitive plate relative to each other during the movement of the camera as a whole. By this means different interlineated portions of the photographically sensitive plate are exposed to the object field from different points of view. The length of travel of the plate with respect to the lineating screen is preferably coordinated with the length of travel of the camera so that the panels of the resultant parallax panoramagram just touch adjacent panels without overlapping. Apparatus of this class has been described in U. S. Patents Nos. 1,260,682 and 1,900,562. In the latter patent the desired movement of the camera about a chosen point in the object field is secured by pivoting the camera carriage at that point. This apparatus has been found to give good results in practice.

Other types of apparatus have been proposed for moving the camera in the desired path about the principal objects being photographed, but in general have been either inflexible or somewhat inconvenient in use. Also, types have been proposed in which the camera itself is deformed during the movement thereof. That is, the lens and plate of the camera are moved laterally with respect to each other during the movement about the objects. This type of movement is undesirable because it necessitates the use of a wide angle lens. The aberrations of such a lens are much more difficult to correct than those of camera lenses of ordinary field of view, and the image field of such a lens has much less intensity of illumination at the margins thereof than at the center. This results in unequal exposure of the center and the margins of the photographic plate.

In the ordinary commercial use of equipment of this type, it is necessary to photograph objects at varying distances from the camera, as the occasion requires. Since it is usually desirable to have the camera move in an arc about the principal objects being photographed, or about a desired point chosen with a view to exhibiting the objects as effectively as possible, means have been provided in apparatus heretofore devised to change the radius of the arc in which the camera moves. While this is feasible, it has certain disadvantages as far as portability is concerned. Also, certain types of such apparatus are rather inconvenient and clumsy in use.

The present invention is directed primarily to the provision of apparatus which can be made readily portable and easily trundled from place to place, which is easy to adjust for different object distances, and which is adapted to fulfill the foregoing requirements without necessitating deformation of the camera as it moves along its path of travel.

In accordance with the invention, a supporting means is provided which is adapted to carry the camera as a unit, without deformation thereof. The camera is mounted on the supporting means in any suitable manner which meets the demands of the photographer. For example, means for raising and lowering the camera and for elevating and depressing the front of the camera may be provided as in ordinary commercial camera mounts. The camera supporting means is provided with a pair of spaced guide elements which are constrained to move along predetermined paths by suitable guides positioned on a suitably constructed base. The guides are preferably parallel, or substantially so, and one or both of them immovably fixed to the base.

The necessary motion of the camera with respect to the object field is produced by moving the camera supporting means and camera laterally along the guides and causing the spaced guide elements to move along their respective paths at relatively different speeds such that the camera is maintained pointed at a chosen point in the object field. When it is desired to change the distance of the point at which the camera is to be maintained pointed, the present invention contemplates effecting this result, without changing the paths of the guide elements, by changing the proportional speeds at which the elements move along their respective paths.

In the preferred embodiment of the invention the guides are parallel and both are immovably fixed to the base. A constant ratio of speed is maintained between the guide elements so that the camera is maintained precisely pointed at the desired part of the object field, and means are provided for changing the ratio of speeds so as to point at some other chosen part. By this method of obtaining the desired motion of the camera a very compact, convenient and precise apparatus is obtainable, and by supplying the base with suitable trundles the apparatus is made readily portable. Other embodiments of the invention depart from the preferred embodiment in certain respects, but the general features are similar. In each case the adjustment of the apparatus may be changed to maintain the camera pointed at a different chosen part of the object field without substantially changing the paths of the camera guide elements, and the correct movement of the camera is obtained without deforming the camera during the movement thereof.

The various features and advantages of the invention may be more fully understood from the drawings, which illustrate several embodiments of the invention, and the following description thereof.

In the drawings:

Fig. 1 is a plan view of the preferred embodiment of the invention;

Fig. 2 is a rear elevation thereof;

Figs. 3 and 4 are right and left end elevations thereof, respectively;

Fig. 5 is a plan view of another embodiment of the invention showing different means for producing the relative motion of the guide elements;

Figs. 6 and 7 are rear and left end elevations, respectively, of the embodiment of Fig. 5;

Figs. 8 and 9 are plan and rear views, with much of the detail omitted, of a modification of the embodiment of Figs. 5 to 7; and Figs. 10 and 11 are plan and rear views, with much of the detail omitted, of a modification of the apparatus of Figs. 1 to 4.

Referring now to Figs. 1 to 4, inclusive, a base 15 of suitable construction is provided with a pair of parallel ways 16 in which the blocks 17 and 18 (Fig. 3) are constrained to move in guided relationship. The camera 19 is mounted on a support plate 20, at the front end of which the block 17 is pivoted by pin 21. The rear end of plate 20 is provided with a slot 22 along which slider 23 is free to move. Slider 23 is pivoted to block 18. Instead of mounting camera 19 directly on supporting plate 20, a suitable adjustable stand may be provided for raising and lowering the camera, and for pointing it in different directions, to meet with the various demands of commercial photography. Since such stands are well-known in the art they have not been illustrated. Support plate 20 and blocks 17 and 18 provide a carriage for moving the camera laterally along the guide ways 16.

The base 15 is provided with a pair of lead screws 24 and 25 which engage suitable threaded portions of blocks 17 and 18 to move them along the guide ways 16. Continuous uniform movement of the camera along the ways is effected by means of the electric motor 26. This motor acts through pinion 27 (Fig. 4) and idler gear 28 to drive gear 29, which is keyed to lead screw 25. Gear 29, in turn, acts through the idler gear 30 to drive gear 31, which is keyed to lead screw 24.

Since gears 29 and 31 are coupled together, a constant speed ratio is maintained between lead screws 24 and 25. Thus the distance through which the block 17 moves is directly proportional to the distance through which block 18 moves. For this reason, by simple geometric considerations, it will be seen that a line through pin 21 and slider 23 always passes through a common point 32 during the movement of the support plate. The dotted lines in Fig. 1 illustrate the manner in which plate 20 turns as it moves along the guide ways. Since the axis of the camera is aligned with pin 21 and slider 23, the camera will always point at an object in the position of point 32. Thus by a very simple and compact mechanism a movement of the camera is produced which insures that a certain chosen point in the object field will always be focussed at the same point in the image field of the camera during the movement thereof, thereby producing correct stereoscopically related views of the object field. In making parallax panoramagram pictures uniform motion of the camera is desired, but if, for any reason, other than uniform motion is desired, the driving means may be appropriately altered.

Gear 31 is removably keyed to lead screw 24 so that different sized gears may be employed, thereby providing for changing the ratio of the speeds of lead screws 24 and 25. By changing this ratio, point 32 may be moved toward or away from the apparatus, thus providing for taking objects at lesser or greater distances as desired. Pinion 27 is also changeable so that the speed of motion of the camera may be changed, to provide for different lengths of exposure, etc. Idler gears 28 and 30 are adjustably mounted to facilitate changing gears 31 and 27, respectively.

Camera 19 is provided with a lineated screen adjacent the front surface of the photographic plate to expose only a lineated area of the plate to the object field at any instant. Means are provided for uniformly moving the plate and lineating screen with respect to each other during the movement of the camera to expose different interlineated areas of the plate to different views of the object field. This means may be that shown in U. S. Patent No. 1,900,566. To coordinate the movement of the plate behind the lineating screen with the movement of the camera as a whole, pinion 33 is keyed to its shaft so as to turn with gear 29, and drives gear 34, which in turn drives the plate moving mechanism through the flexible shaft 35. The gears 33 and 34 are changeable so that it is possible to change the distance that the camera as a whole travels during the time the photographic plate is moved the distance from one lineation to the next. Means are also provided for coordinating the operation of the shutter with the motion of the plate, so that the shutter will close as soon as the entire area of the plate has been exposed. The shutter is preferably electromagnetically operated by dry cells 36 through suitable contacts controlled by the plate moving means. By adjusting the ratio of gears 33 and 34 the angle through which the parallax panoramagram is taken may be conveniently changed.

In general the pivot 21 will be in line with the slot 22 so that a line drawn through pin 21 and slider 23 will aways pass through a particular point in the object field as the camera moves laterally. Serious departures from this condition will probably result in somewhat inferior pictures, but may be permissible in some instances. The camera will usually be disposed on plate 20 with its axis parallel to the line connecting pin 21 and slider 23, but provision may be made for disposing it at an angle in order to secure special effects.

In this embodiment the apparatus for moving the camera and keeping it pointed in the proper direction is very compact, and is entirely mounted on the supporting base 15. It is therefore rendered easily movable by supplying the base with suitable casters or trundles 37. The various dimensions of apparatus may be adapted to meet the requirements of the studio.

The modification shown in Figs. 5 to 7, inclusive, is similar in many respects to that of Figs. 1 to 4, but differs in the means by which the proper relative motion between the guide elements 17 and 18 is produced. In Figs. 1 to 4, relative motion was produced by means of two lead screws, one for each guide element, rotated at different speeds. In the modification of Figs. 5 to 7, only one lead screw is provided for driving the camera, and the relative motion between blocks 17 and 18 is produced by means of links 38 and 39 pivoted in spaced relationship to lever arm 40. Links 38 and 39 are pivoted to the blocks 17 and 18, respectively, and are supported on rollers 41 mounted on base 15. Lever arm 40 is pivoted on a suitable column 42. Lead screw 25 is driven by motor 26 through pinion 27, idler gear 28 and gear 29, as in the previous embodiment, and drives block 18 along the guide way 16. Motion is imparted to block 17 through links 38 and 39 and the lever arm 40. Blocks 17 and 18 are attached to and move the plate 20 as in the previous embodiment. Since the link 38 is nearer the pivot column 42 than the link 39, the distance traveled by block 17 will be less than that traveled by block 18, and the camera will assume the position shown in dotted lines in Fig. 5.

For angles of travel of the camera of the magnitudes ordinarily employed in taking pictures of the parallax panoramagram type, the ratio of the distances traveled by blocks 17 and 18 will remain very nearly constant. Thus the camera will always be pointed substantially at a common point 43, and this point will be substantially on a line drawn through the pivot column 42 parallel to the guide ways 16. The slight departure from the theoretically correct movement will ordinarily be quite insignificant. If it is desired, however, the links 38 and 39 may be constrained to move always parallel to the guide ways 16, and may be attached to the lever arm 40 through slots in the lever arm, in order to obtain the same movement as in the embodiment of Figs. 1 to 4. A number of holes 44 may be provided in lever arm 40 so that the pivot column 42 may be moved different distances in front of the camera and the center of the taking directions thereby changed. Although movement of the camera is conveniently produced by means of a lead screw 25, as illustrated, other suitable means for producing the movement can be employed, if desired.

The mechanism for driving the plate moving mechanism in coordination with the movement of the camera as a whole is the same as in Figs. 1 to 4, and need not be described again. This embodiment may also be rendered readily movable by adding casters, or other suitable trundle means.

Figs. 8 and 9 illustrate a modification of the embodiment of Figs. 5 to 7. Instead of links 38 and 39 being attached to blocks 17 and 18, they are pivoted to plate 20 in spaced relationship by pins 45 and 46. The movement of plate 20 along the base is guided by blocks 17 and 18 as before. If the links 38 and 39 are made of equal length and pivoted to the plate 20 and lever arm 40 so as to be parallel to each other, the line connecting pivots 45 and 46 will always be parallel to the lever arm, and the camera will always point in the same direction. The difference in the movement of the camera carriage and camera produced by the apparatus of Fig. 5 and that of Fig. 8 is slight, and ordinarily will be quite negligible for lengths of travel usually employed.

Figs. 10 and 11 illustrate a modification of the embodiment of Figs. 1 to 4. In Fig. 10 the plate 20 is pivoted at its front end by pin 21 to a block 17 which moves in guided relationship along guide way 16, as in Fig. 1. But instead of having the rear of plate 20 slidably engage a block which is moved along a guide way, as in Fig. 1, the plate 20 is pivoted by pin 47 to a block 48 which is threaded to engage lead screw 49. It will be seen that the distance between pins 21 and 47 is fixed, yet plate 20 must rotate a certain amount as it moves along the base. The necessary flexibility is obtained by providing lead screw 49 with a flexible coupling 50 so that lead screw 49 can swing from side to side the necessary amount as the plate 20 is moved in its path of travel. The block 48 is preferably made wide enough to ride on a suitable surface of base 15, such as the top of rear guide 16, so as to bear the weight of the camera.

The driving mechanism for this modification is the same as that of Figs. 1 to 4 and so need not be described again. The movement produced by this modification will not be precisely the same as that of Fig. 1, since the elements 47 and 21 do not move in exactly parallel paths, and the camera will not be maintained pointed at precisely the same point as it moves along the base. For ordinary lengths of travel, however, the departure from the precisely correct movement will not seriously affect the results obtained. If desired, the front lead screw 24 could be provided with a flexible coupling and the rear lead screw made rigid. In such a case the rear guide block 48 would be made to move along the rear guide way in guided relationship and the front guide block allowed to move laterally.

It will be evident that various details of the apparatus herein described may be changed without departing from the spirit and scope of the invention. For example, other types of guide elements and guide ways may be substituted for the blocks and grooved ways shown herein. Means have been shown for driving the camera and support at uniform speed along the path of travel. If other than uniform speed is desired for any reason, it could be provided for. Also, although a plate has been shown as the simplest means for carrying the camera, other suitable supporting means adapted to carry the camera as an undeformed unit could be employed. It also may be desirable in some cases to combine separate features of the several embodiments and modifications herein described in a manner other than is specifically described herein. Furthermore, other suitable means to permit the apparatus to be trundled from place to place may be provided.

I claim:

1. Apparatus for taking stereoscopically related views of an object field from different points of view which comprises a camera adapted to record images of the parallax panoramagram type, a support for said camera adapted to carry the camera as a unit, a base having a pair of parallel straight fixed guide ways side by side thereon, a guide element pivoted to said support and adapted to move in guided relationship along one of said ways, a second guide element associated with said support and axially separated from the first-mentioned element with respect to the taking direction of the camera, said second guide element slidably engaging said support for axial but not lateral movement with respect to the support, and means for moving said support and guide elements along said base with the guide elements simultaneously moving at substantially constant but different speeds along their respective ways, the ratio between the movements of the guide elements along their respective guide ways being thereby maintained substantially constant so that said camera is moved laterally along the base and simultaneously rotated so as to be maintained pointed at a desired point in the object field.

2. Apparatus for taking stereoscopically related views of an object field from different points of view which comprises a camera adapted to record images of the parallax panoramagram type, a support for said camera adapted to carry the camera as a unit, a base having a pair of parallel straight fixed guide ways thereon, a guide element pivoted to said support and adapted to move in guided relationship along one of said ways, a second guide element associated with said support and axially separated from the first-mentioned element with respect to the taking direction of the camera, said second guide element slidably engaging said support to permit axial but not lateral movement with respect thereto, a pair of lead screws engaging said guide elements respectively and adapted to move said elements along said ways, and means for driving said lead screws at a constant ratio of speeds.

3. Apparatus for taking stereoscopically related views of an object field from different points of view which comprises a base having a pair of spaced substantially parallel guide ways thereon, at least one of said guide ways being fixed with respect to the base, a camera, a carriage for said camera including supporting means adapted to carry said camera as a unit and a pair of elements associated with the supporting means with separation between them along the taking direction of the camera, said elements cooperating with said guide ways respectively and being adapted to guide the camera laterally therealong, means for moving said carriage along said ways and simultaneously effecting a relative movement between said elements to rotate said camera, the last-mentioned means including a lever adapted to be pivoted at a chosen point lateral to the direction of said guide ways and spaced links connecting said lever with said carriage.

4. Apparatus for taking stereoscopically related views of an object field from different points of view which comprises a base having a pair of spaced substantially parallel fixed guide ways thereon, a camera, a carriage for said camera including supporting means adapted to carry said camera as a unit and a pair of elements associated with the supporting means with separation between them along the taking direction of the camera, one of said elements being pivotally associated with said supporting means and adapted to move in guided relationship along one of said ways and the other of said elements being movable longitudinally but not laterally with respect to the supporting means and adapted to cooperate with the other of said ways to guide said supporting means laterally therealong, means for moving said carriage along said ways and simultaneously effecting a relative movement between said elements to maintain the camera pointed at a desired portion of the object field, the last-mentioned means including a lever adapted to be pivoted at a chosen point lateral to the direction of said guide ways and spaced links connecting said lever with said carriage.

5. Apparatus for taking stereoscopically related views of an object field from different points of view which comprises a base having a pair of spaced substantially parallel fixed guide ways thereon, a camera adapted to record images of the parallax panoramagram type, a carriage for said camera including supporting means adapted to carry said camera as a unit and a pair of elements associated with the supporting means with separation between them along the taking direction of the camera, one of said elements being pivotally associated with said supporting means and adapted to move in guided relationship along one of said ways and the other of said elements being movable longitudinally but not laterally with respect to the supporting means and adapted to cooperate with the other of said ways to guide said supporting means laterally therealong, and means for moving said carriage along said ways and simultaneously effecting a relative movement between said elements such that a certain point of the object field is imaged always at substantially the same point of the image field of the camera during the lateral movement thereof, the last-mentioned means including a lever pivoted substantially on a line drawn through said certain point parallel to said guide ways and a pair of spaced substantially parallel links connecting said lever to said carriage.

6. Apparatus for taking stereoscopically related views of an object field from different points of view which comprises a camera adapted to record images of the parallax panoramagram type, a support for said camera adapted to carry the camera as a unit, a base having a pair of parallel straight fixed guide ways thereon, a guide element pivoted to said support and adapted to move in guided relationship along one of said ways, a second guide element associated with said support and axially separated from the first-mentioned element with respect to the taking direction of the camera, said second guide element slidably engaging said support to permit axial but not lateral movement with respect thereto, means for moving said support along said base at substantially uniform speeds and simultaneously effecting a relative movement between said guide elements such that a certain point of the object field is imaged always at substantially the same point of the image field of the camera during the lateral movement thereof, the last-mentioned means including a lever adapted to be pivoted substantially on a line drawn through said certain point parallel to said guide ways and a pair of spaced substantially parallel links connecting said lever to the respective guide elements.

7. Apparatus for taking stereoscopically related views of an object field from different points of view which comprises a camera adapted to record images of the parallax panoramagram type, a carriage for said camera including a support adapted to carry said camera as a unit and a pair of elements pivoted to said support and spaced axially with respect to the camera, a base adapted to support said carriage for lateral movement therealong and having a fixed substantially straight guide way along which one of said elements is adapted to move in guided relationship, a lead screw rotatably mounted on said base and engaging said one element to move it along said path, a second lead screw rotatably mounted on said base and engaging the other of said elements to move it therealong, said second lead screw having a flexible joint permitting lateral movement thereof, coupling means between said lead screws to secure a desired ratio of speed therebetween, means for changing said ratio, and driving means for said lead screws, whereby said camera may be moved laterally along said base and simultaneously turned so that a certain particular point of the object field is imaged always at substantially the same point of the image field of the camera during the lateral movement thereof.

8. Apparatus for taking stereoscopically related views of an object field from different points of view which comprises a camera adapted to record images of the parallax panoramagram type, a support for said camera carrying the camera as a unit, a base having a pair of parallel straight fixed guide ways thereon, a pair of guide elements associated with said support with axial separation between them with respect to the taking direction of the camera and adapted to move in guided relationship along their respective guide ways, one of said guide elements being pivotally associated with said support and the other being mounted so as to be free to move axially but not laterally with respect to said support, and means for moving said guide elements along said ways with a relative movement therebetween, whereby the camera may be moved laterally along the ways and simultaneously turned.

9. In apparatus for taking stereoscopically related views of an object field from different points of view, the combination which comprises camera supporting means for carrying a camera as a unit, a base along which said camera supporting means is movable, a pair of spaced guide elements connected to said supporting means and adapted to move with and guide said supporting means, means for guiding said elements along separate substantially parallel planar paths, said paths being separated in a direction lateral to the direction of the paths and at least one of said paths being fixed with respect to the base, the connection of said elements to said supporting means and the means for guiding said elements being so designed and constructed that the camera supporting means can rotate through a substantial angle with respect to said fixed path as the camera supporting means is moved along the base, and means for moving said camera supporting means and said spaced elements associated therewith along the base and simultaneously effecting a relative movement between said spaced elements to rotate the camera supporting means through an angle with respect to said fixed path as it is moved along the base to maintain a camera on said camera supporting means directed toward substantially the same object field.

10. In apparatus for taking stereoscopically related views of an object field from different points of view, the combination which comprises camera supporting means for carrying a camera as a unit, a base along which said camera supporting means is movable, a pair of spaced elements connected to said supporting means and adapted to move with and guide said supporting means, means for guiding said elements along separate substantially parallel substantially straight paths, said paths being separated in a direction lateral to the direction of the paths and at least one of said paths being fixed with respect to the base, the connection of said elements to said supporting means and the means for guiding said elements being so designed and constructed that the camera supporting means can rotate through a substantial angle with respect to said fixed path as the camera supporting means is moved along the base, and means for moving said camera supporting means and said spaced elements associated therewith along the base with the spaced elements moving at relatively different speeds along their respective paths, the ratio between said speeds being maintained substantially constant to maintain a camera on said camera supporting means directed toward substantially the same object field.

11. In apparatus for taking stereoscopically related views of an object field from different points of view, the combination which comprises camera supporting means for carrying a camera as a unit, a base having a pair of substantially straight substantially parallel guide ways thereon, said guide ways being separated in a direction lateral to the direction of the guide ways, a pair of spaced elements associated with said camera supporting means, said elements cooperating with said guide ways respectively and being adapted to guide said camera supporting means laterally along said guide ways, and means for moving said camera supporting means and said spaced elements along the base and simultaneously effecting a relative movement between said spaced elements to rotate the camera supporting means through an angle as it is moved along the base to maintain a camera on said camera supporting means directed toward substantially the same object field.

12. In apparatus for taking stereoscopically related views of an object field from different points of view, the combination which comprises a camera support for carrying a camera as a unit, a base having a pair of substantially parallel fixed guide ways thereon, said guide ways being separated in a direction lateral to the direction of the guide ways, a guide element pivotally associated with said camera support and adapted to move in guided relationship along one of said ways, a second guide element connected to move with and guide said camera support and adapted to move in guided relationship along the other of said ways, said second guide element being so connected with said camera support that the camera support can rotate through a substantial angle with respect to the fixed guide ways as the camera support is moved along the base, and means for moving said camera support and said guide elements along said base and simultaneously effecting a relative movement between said guide elements to rotate the camera support through an angle with respect to the fixed guide ways as it is moved along the base to maintain a camera on said camera support directed toward substantially the same object field.

13. In apparatus for taking stereoscopically related views of an object field from different points of view, the combination which comprises a camera support for carrying a camera as a unit, a base having a pair of parallel straight fixed guide ways thereon, said guide ways being separated in a direction lateral to the direction of the guide ways, a guide element pivoted to said support and adapted to move in guided relationship along one of said ways, a second guide element connected with said camera support and adapted to move in guided relationship along the other of said ways, said second guide element being slidably connected with said camera support so that the second guide element is free to move in a direction toward and away from the point at which the first guide element is pivoted to the camera support but is not free to move laterally to said direction, and means for moving said camera support and guide elements along said base with different relative movements of the guide elements along their respective guide ways, the ratio between the movements of the guide elements along their respective guide ways being maintained substantially constant, whereby a camera on said camera support may be moved laterally along said base and maintained pointed at a desired point in the object field.

14. In apparatus for taking stereoscopically related views of an object field from different points of view, the combination which comprises a carriage for a camera including supporting means adapted to carry the camera as a unit and a pair of spaced guide elements associated with the supporting means with fixed separation between them, a base supporting said carriage for planar movement therealong and having a substantially straight fixed guide way along which one of said elements is adapted to move in guided relationship, means for guiding the other of said elements along a path substantially parallel to said guide way and separated therefrom in a direction lateral to the direction of the guide way, means for moving said carriage along said base and producing different relative movements of said elements along their respective paths, the ratio between the movements of the elements being maintained substantially constant so that a camera on said carriage may be moved along said base and maintained pointed at a desired point in the object field.

CLARENCE W. KANOLT.